United States Patent Office 3,546,246
Patented Dec. 8, 1970

3,546,246
N-AMINOALKYL-BENZOTHIAZOCINES
Henri Morren, Forest, Belgium, assignor to UCB (Union Chimique-Chemische Bedrijven), S.A., Saint-Gilles-Brussels, Belgium
No Drawing. Continuation-in-part of application Ser. No. 579,232, Sept. 14, 1966. This application Oct. 23, 1968, Ser. No. 770,107
Int. Cl. A61k 27/00; C07d 99/00
U.S. Cl. 260—327                                    13 Claims

ABSTRACT OF THE DISCLOSURE

N-aminoalkyl-benzothiazacycloalkanes of the formula

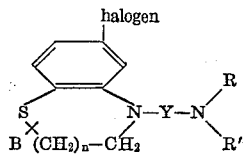

wherein $n$ is 3
halogen is chlorine or fluorine
B is H or lower alkyl
Y is an alkylene and
R and R' are the same or different, each being H, alkyl, alkenyl or R and R' together with the N atom, form a heterocyclic ring (e.g. pyrrolidono, 4-(2-hydroxyethyl)-piperazino). They have both imipramine-like and thiazesim-like antidepressive activity, and are therefore useful in the treatment of mental depression. Methods of preparing the compounds of said formula are disclosed.

This application is a continuation-in-part of copending application Ser. No. 579,232 filed Sep. 14, 1966, now abandoned.

The present invention relates to new N-aminoalkyl-benzothiazacycloalkanes and therapeutically useful acid addition salts thereof.

The new N-aminoalkyl-benzothiazacycloalkanes of the present invention may be represented by the general formula:

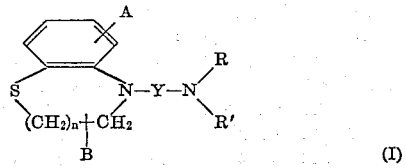

wherein

A represent hydrogen, halogen, lower alkyl, lower alkoxy, acyl (e.g. acetyl), lower haloalkyl (e.g. trifluoromethyl) or cyano,
B is hydrogen or lower alkyl
R and R' taken separately each represents hydrogen, lower alkyl or lower alkenyl or taken together represent with the nitrogen atom to which they are attached a heterocyclic ring which may be substituted and/or contain other heteroatoms, for example pyrrolidino, piperidino, morpholino, piperazino, 4-methylpiperazino, 4-(2-hydroxyethyl)-piperazino and the like,
Y is a straight or branched chain alkylene radical which may contain 1 to 5 carbon atoms, advantageously ethylene, propylene or methyl-propylene, and
$n$ is 3 or 4.

The terms "lower alkyl," "lower alkoxy," "lower haloalkyl" and "lower alkenyl," as employed herein include both straight and branched chain radicals of less than eight carbon atoms.

The N-aminoalkyl-benzothiazacycloalkanes according to the present invention are derivatives of 6H-1,6-benzothiazocine ($n=3$) and of 1,7-benzothiazonine ($n=4$).

The invention relates also to the acid addition salts of these new benzothiazacyclolkanes. The bases of Formula I form addition salts with common inorganic and organic acids, particularly therapeutically acceptable non-toxic acid addition salts, such as hyrochlorides, sulfates, nitrates, borates, oxalates, tartrates, maleates, citrates and the like.

In order to prepare the new N-aminoalkyl-benzothiazacycloalkanes of Formula I, a number of conventional methods may be used:

(1) Reduction of the corresponding N-aminoalkyl-benzothiazacycloalkanones (Ia), for example by treatment with lithium aluminum hydride in accordance with the equation:

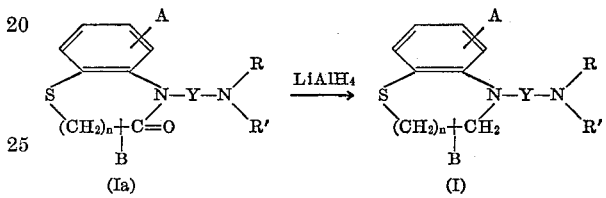

A, B, R, R', Y and $n$ have the same meanings as above. The benzothiazacycloalkanones (Ia) used as starting materials may be prepared by the methods described in copending application Ser. No. 579,232, filed Sept. 14, 1966.

(2) Condensation of an appropriate benzothiazacycloalkane (II) with an aminoalkyl-halide (III) in accordance with the equation:

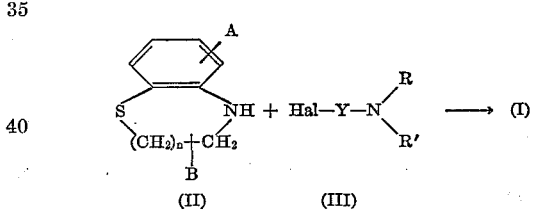

A, B, R, R', Y and $n$ have the same meanings as above and Hal designates a halogen atom;

(3) Condensation of an appropriate benzothiazacycloalkane (II) with an alpha, omega-chlorobromoalkane (IV) in the presence of an acid acceptor to give a compound chlorinated at the end of the chain of the Formula V, which is then condensed with a nitrogen compound of the formula HN(R)R' to give the desired compound of the Formula I in accordance with the equation:

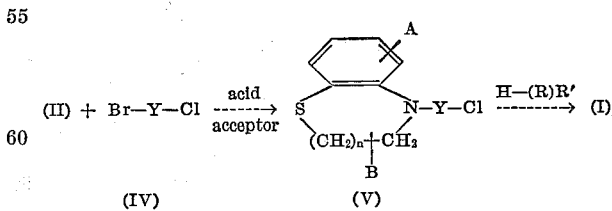

A, B, R, R', Y and $n$ have the same meanings as above;

(4) For the preparation of N-monoalkylaminoalkyl-benzothiazacycloalkanes (R=H and R'=lower alkyl in the Formula I) it is also possible to subject a compound of Formula Ib, which carries on the terminal nitrogen atom a radical which can easily be split off, for example, a methyl radical (R=CH$_3$), to the action of ethyl chloroformate, thus giving a corresponding carbethoxy derivative of Formula VI which is then subjected to alkaline or acid hydrolysis in accordance with the equation:

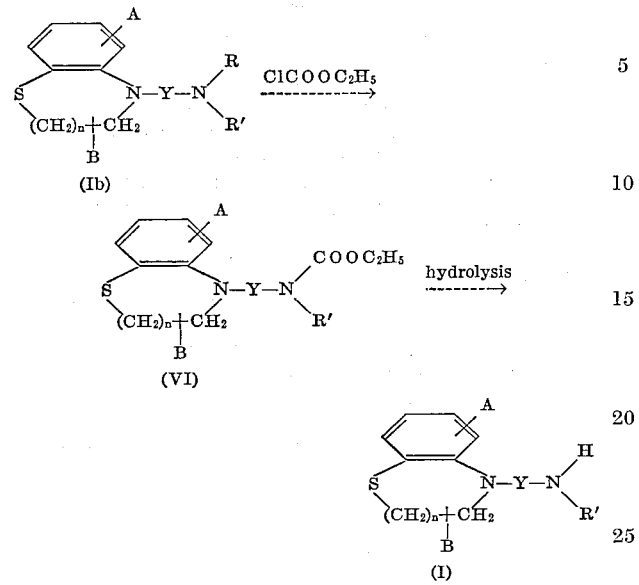

A, B, Y and $n$ have the same meanings as above, R is a radical which can easily be split off and R' is a lower alkyl radical;

(5) For preparing N-methylaminoalkyl-benzothiazacycloalkanes (R=H and R'=CH₃ in the Formula I), an N-aminoalkyl-benzothiazacycloalkane of Formula VII can be reacted with ethyl chloroformate, thus giving the corresponding carbethoxy derivative of Formula VIII which is then subjected to a hydrogenolysis for example by treatment with lithium aluminum hydride in accordance with the equation:

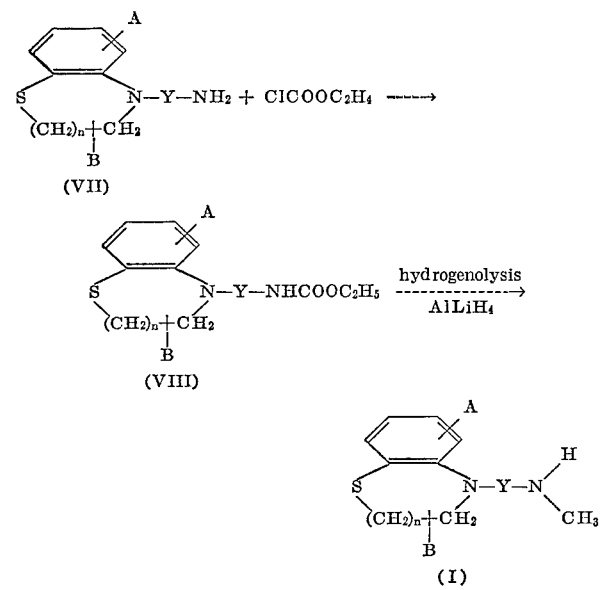

A, B, Y and $n$ have the same meanings as above;

(6) When it is desired to prepare N-aminoethyl-benzothiazacycloalkanes (R=R'=H and Y=CH₂CH₂ in the Formula I) the following method may be used: an appropriate benzothiazacycloalkane of Formula II is reacted with chloroacetonitrile and the obtained N-cyanomethylbenzothiazacycloalkane (IX) is reduced for example by treatment with lithium aluminum hydride in accordance with the equation:

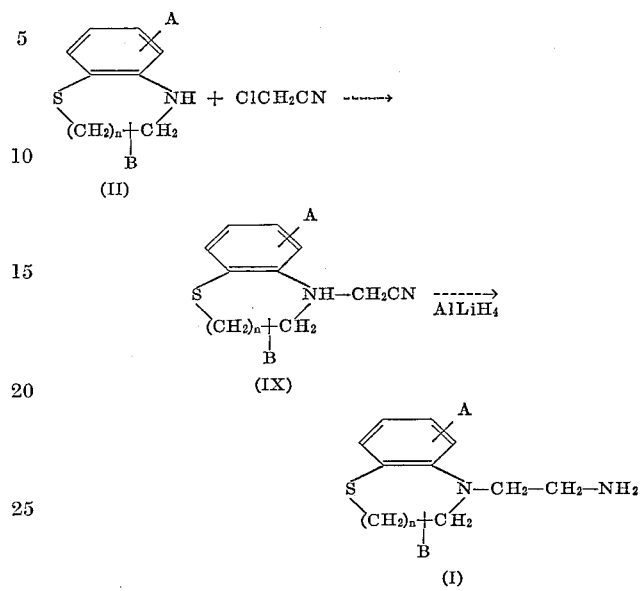

A, B and $n$ have the same meanings as above.

The benzothiazacycloalkanes (II) used as starting materials can be obtained from the corresponding benzothiazacycloalkanones (X) by reduction of the carbonyl function thereof with lithium aluminum hydride in accordance with the equation:

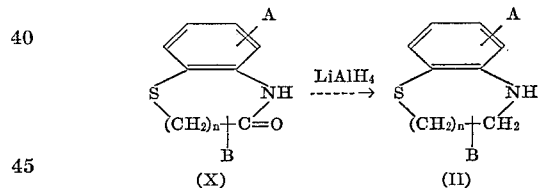

wherein A, B and $n$ have the same meanings as above.

The N-aminoalkyl-benzothiazacycloalkanes of the present invention have not hitherto been described in literature. They are more especially characterized by their antidepressant activity and are therefore very useful in the treatment of mental depression. The pharmacological tests given below show the antidepressive activity of these compounds.

One of these tests consists in determining the antitetrabenazine activity according to the method of M. Giurgea et al. (Med. Experimentalis, 9, (1963), 249–262). The minimum dose of compound is determined which, when subcutaneously administered to rat one hour before subcutaneous administration of 10 mg./kg. of tetrabenazine (1,3,4,6,7,11b - hexahydro - 3 - isobutyl-9,10-dimethoxy-2H-benzo[a]-quinolizin-2-one) causes, in 50% of the animals, the opening of the palpebral fissure and normal reactivity.

The compounds of the invention show a high antitetrabenazine activity. For example, in Table I herebelow, the antitetrabenazine activity (expressed in mg./kg. body weight) of a compound of the invention, i.e. 8-chloro-6-(2 - dimethylamino - ethyl) - 2,3,4,5 - tetrahydro - 6H-1,6-benzothiazocine (compound B) is compared with that of imipramine i.e. 5 - (3 - dimethylaminopropyl)-10,11-dihydro-5H-dibenzo(b,f)azepine (compound A) which is a known antidepressant. The toxicity (L.D. 50), intravenously determined in rat, is expressed in mg./kg. body weight.

TABLE I

| Compound | Antitetrabenazine activity | Toxicity (L.D. 50) |
| --- | --- | --- |
| A | 17 | 26 |
| B | 8.5 | 40.7 |

The figures of Table I show that compound B of the invention is twice as active as known compound A, while compound B is, moreover, considerably less toxic.

Besides the above-mentioned known antidepressant, there are others, such as thiazesim [5-(2-dimethylaminoethyl) - 2-phenyl - 2,3 - dihydro-5H-1,5-benzothiazepin-4-one; compound C in Table II hereafter], which only slightly antagonize tetrabenazine. The activity of this type of antidepressants is measured by the aggressiveness inhibition test of killer rats towards mice (cf. P. Karli, "The Norway Rat's Killing Response to the White Mouse— An Experimental Analysis," Behaviour (Leiden), 10, (1956), 81).

For this test, rats are selected that kill mice. After about two consecutive days of stable killing behaviour, the antidepressants to be tested are intraperitoneally administered to the rats and the minimum dose (in mg./kg.) is recorded that protects 50% of the mice.

I have found that several compounds of the invention give a positive response in this test, while still showing a considerable activity in the antitetrabenazine test. It therefore becomes evident that the compounds of the invention possess both imipramine-like and thiazesim-like activities.

In Table II hereafter, the activity of thiazesim is compared with that of 4 compounds of the invention:

8 - chloro-6-(3-dimehylamino-propyl)-2,3,4,5-tetrahydro-6H-1,6-benzothiazocine (compound D);

8 - chloro - 6-(3-dimethylamino-2-methyl-propyl)-2,3,4,5-tetrahydro-6H-1,6-benzothiazocine (compound E);

8-chloro-6-(2-aminoethyl)-2,3,4,5-tetrahydro-6H-1,6-benzothiazocine (compound F);

8 - chloro-6-(3-dimethylamino-propyl)-2,3,4,5-tetrahydro-6H-1,6-benzothiazocine (compound G).

The results obtained in the antitetrabenazine test (expressed in mg./kg. body weight) as well as the toxicity according to the test of S. Irwin are given ("General Philosophy and Methodology of Screening. A Multidimensional Approach," Gordon Reserach Conference on Medicinal Chemistry, Aug. 3–7, 1959 at Colby Junior College, New London). In the Irwin test, products are intraperitoneally administered to mice in increasing doses and the behaviour is recorded; results are expressed in mg./kg. of animal.

TABLE II

| Compound | Irwin toxicity | Antitetrabenazine activity | Aggressiveness inhibition |
| --- | --- | --- | --- |
| C | 68: convulsions / 102: dead | 102 | 27 |
| D | 90: convulsions / 180: dead | 60 | 21.5 |
| E | 94: convulsions / 188: dead | 63 | 31 |
| F | 77: dead | 26 | 13 |
| G | 81: dead | 54 | 17.5 |

The new N-aminoalkyl-benzothiazacycloalkanes may be used as medicaments in the form of pharmaceutical preparations, which contain the new compounds or the salts thereof in admixture with a pharmaceutical organic or inorganic solid or liquid carrier suitable for enteral or parenteral administration.

The pharmaceutical compositions suitable for oral administration may be solid or liquid, for example, in the form of tablets, pills, gelatine capsules, solutions, syrups, and the like. The compositions suitable for parenteral administration are the known pharmaceutical forms such as aqueous or oily solutions, suspensions or emulsions. For rectal administration, the compositions of the invention are generally in the form of suppositories.

The pharmaceutical forms such as injectable solutions or suspensions, tablets, drops, suppositories and the like are prepared according to the common methods used by druggists.

The active compound of the present invention is mixed with a solid or liquid non-toxic pharmaceutically-acceptable carrier and eventually a dispersing or stabilizing agent, and the like. Preservatives, sweeteners, flavoring and coloring agents and the like are added if desired.

The solid or liquid pharmaceutical excipients used in these compositions are also known to the man of the art. Solid pharmaceutical excipients for the preparation of tablets or capsules are, for example, starch, talcum, calcium carbonate, lactose, sucrose, magnesium stearate and the like. Suitable liquid pharmaceutically acceptable media are, for example, water, aqueous glycols, lactose or sucrose solutions and the like.

The percent of active substance in the pharmaceutical compositions varies within very wide limits depending on conditions of use, particularly frequency of administration.

The physician will indicate daily dosage of the active therapeutic agents of this invention. The dosage will be dependent upon the extent of mental depression, whether mild or severe. Suitable posology is a dosage of from 75 to 100 mg. of active substance per day, administered for example in three times. In severe depression, considerably higher daily dosage may be required, whereas for mild depression less active substance per day may be indicated. Tablets or capsules containing 25, 50, 100 and 150 mg. of the instant therapeutic agents are convenient until dosage forms for daily administration.

The following examples are given for the purpose of illustrating the present invention.

EXAMPLE 1

6-(3-dimethylamino-2-methyl-propyl)-2,3,4,5-tetrahydro-6H-1,6-benzothiazocine

A solution of 22.5 g. 6-(3-dimethylamino-2-methylpropyl)-2,3-dihydro-6H-1,6-benzothiazocin-5-(4H)-one is slowly added at a temperature of 20–25° C. to a suspension of 6 g. lithium aluminum hydride in 500 ml. ether. After heating under reflux for 15 hours, the reaction mixture is successively treated with 6 ml. water, 6 ml. of a 20% aqueous solution of sodium hydroxide and 18 ml. water. The mixture is filtered and the ethereal filtrate is dried over anhydrous potassium carbonate. The solvent is evaporated and the residue distilled.

B.P. of the base, 110–112° C. (0.001 mm. Hg). M.P. of the hydrochloride, 159–160° C.

Calculated for $C_{16}H_{26}N_2S \cdot HCl$ (percent): N, 8.89; Cl, 11.25. Found (percent): N, 8.82; Cl, 11.5.

EXAMPLE 2

8-chloro-6-(3-dimethylamino-propyl)-2,3,4,5-tetrahydro-6H-1,6-benzothiazocine

This compound is prepared in the manner described in Example 1 by reduction of 8-chloro-6-(3-dimethylaminopropyl) - 2,3 - dihydro - 6H - 1,6 - benzothiazocin - 5 - (4H)-one with lithium aluminum hydride in an ethereal medium.

B.P. of the base, 123–125° C. (0.001 mm. Hg). M.P. of the hydrochloride 180–181° C.

Calculated for $C_{15}H_{23}ClN_2S \cdot HCl$ (percent); Cl–, 10.57; N, 8.35; S, 9.56. Found (percent): Cl–, 10.90; N, 8.45; S, 9.80. Calculated total (percent): Cl, 21.14. Found total (percent): Cl, 21.02.

This compound may also be prepared in the following manner:

(a) 8 - chloro - 2,3,4,5 - tetrahydro - 6H - 1,6 - benzothiazocine.—8-chloro-2,3-dihydro-6H - 1,6 - benzothiazocin-5-(4H)-one is reduced by means of lithium aluminum hydride in the manner described in Example 1.

B.P. 106–108° C. (0.001 mm. Hg). $n_D^{20}$ 1.6291.

(b) 8 - chloro - 6 - (3 - dimethylamino - propyl)-2,3,4,5 - tetrahydro - 6H-1,6-benzothiazocine.—85.6 g. 8-chloro-2,3,4,5-tetrahydro - 6H - 1,6 - benzothiazocine are added, while stirring, to a sodamide suspension in liquid ammonia, prepared from 9.5 g. sodium. 65 g. 1-chloro-3-dimethylamino-propane, dissolved in 50 ml. toluene, are then added, while maintaining the stirring. After evaporation of the ammonia and the addition of 200 ml. toluene, the mixture is heated under reflux for 8 hours. After cooling, water is added and the benzene layer is extracted with 10% hydrochloric acid. The acid solution is rendered alkaline and extracted with benzene. The benzene solution is evaporated to dryness and the residue is distilled.

B.P. of the base 121–123° C. (0.001 mm. Hg). M.P. of the hydrochloride, 180–181° C.

EXAMPLE 3

8-chloro-6-(3-pyrrolidino-propyl)-2,3,4,5-tetrahydro-6H-1,6-benzothiazocine

As in Example 2(a), 8-chloro-2,3-dihydro-6H-1,6-benzothiazocin-5-(4H)-one is reduced with lithium aluminum hydride to 8-chloro-2,3,4,5-tetrahydro - (6H) - 1,6-benzothiazocine; this compound is then condensed, as in Example 2(b), with 1-chloro-3-pyrrolidino-propane.

B.P. of the base, 176–178° C. (0.001 mm. Hg). M.P. of the hydrochloride, 138–139° C.

Calculated for $C_{17}H_{25}ClN_2S \cdot HCl$ (percent): Cl⁻, 9.83; S, 8.85; N, 7.75. Found (percent): Cl⁻, 9.7; S, 8.75; N, 7.6.

EXAMPLE 4

8-methyl-6-(3-dimethylamino-propyl)-2,3,4,5-tetrahydro-6H-1,6-benzothiazocine (a) 8 - methyl - 2,3,4,5 - tetrahydro - 6H - 1,6 - benzothiazocine.—This compound is prepared by reduction of 8-methyl-2,3-dihydro-6H-1,6-benzothiazocin-5-(4H)-one by means of lithium aluminum hydride according to the method described in Example 1.

B.P. 76–78° C. (0.001 mm. Hg).

(b) 8 - methyl - 6 - (3 - dimethylamino - propyl-2,3,4,5 - tetrahydro-6H-1,6-benzothiazocine.—A mixture of 20 g. 8-methyl-2,3,4,5-tetrahydro-6H-1,6-benzothiazocine and 3.6 g. sodium hydride in 40 ml. dimethylformamide is heated for 2 hours at 50–60° C. 20 g.1-chloro-3-dimethylamino-propane are added and the reaction mixture is heated for further 15 hours at 70° C. After cooling, it is decomposed by addition of water and then extracted with benzene. The benzene solution is extracted with dilute hydrochloric acid. The aqueous solution is rendered alkaline with an excess of sodium hydroxide solution and the free base is extracted with benzene. After evaporation of the solvent, the residue is distilled in vacuo.

B.P. of the base, 104–106° C. (0.001 mm. Hg).

The base is converted into the hydrochloride, which melts at 190–191° C.

Calculated for $C_{16}H_{26}N_2S \cdot HCl$ (percent): N, 8.89; Cl⁻, 11.28; S, 10.18. Found (percent): N, 9.05; Cl⁻, 11.28; S, 10.02.

EXAMPLE 5

8-chloro-6-(2-dimethylamino-ethyl)-2,3,4,5-tetrahydro-6H-1,6-benzothiazocine

This compound is prepared by the method described in Example 4(b) from 8-chloro-2,3,4,5-tetrahydro-6H-1,6-benzothiazocine and 1-chloro-2-dimethylamino-ethane.

B.P. of the base, 115–118° C. (0.05 mm. Hg). M.P. of the hydrochloride, 203–204° C Calculated for $C_{14}H_{21}ClN_2S \cdot HCl$ (percent: Cl⁻, 11.3; N, 8.71; S, 9.97. Found (percent): Cl⁻, 11.17; N. 8.86; S, 9.92.

EXAMPLE 6

8-chloro-6-(2-diethylamino-ethyl)-2,3,4,5-tetrahydro-6H-1,6-benzothiazocine

This compound is prepared by the method described in Example 4(b) from 8-chloro-2,3,4,5-tetrahydro-6H-1,6-benzothiazocine and 1-chloro-2-diethylamino-ethane.

B.P. of the base, 130–132° C. (0.001 mm. Hg). M.P. of the hydrochloride, 141–142° C. decomposition.

Calculated for $C_{16}H_{25}ClN_2S \cdot HCl$ (percent): Cl⁻, 10.15; N, 8.02; S, 9.17. Found (percent): Cl⁻, 10.44; N, 8.00; S, 9.40. Calculated total (percent): Cl, 20.29. Found total (percent): Cl, 20.46.

EXAMPLE 7

8-fluoro-6-(3-dimethylamino-propyl)-2,3,4,5-tetrahydro-6H-1,6-benzothiazocine (a) 8 - fluoro - 2,3,4,5 - tetrahydro - 6H - 1,6 - benzothiazocine.—This compound is prepared by reduction of 8 - fluoro - 2,3 - dihydro - 6H - 1,6 - benzothiazocine-5-(4H)-one with lithium aluminum hydride as described in Example 1.

B.P. 74–76° C. (0.001 mm. Hg).

(b) 8 - fluoro - 6 - (3 - dimethylamino- propyl)-2,3,4,5 - tetrahydro-6H-1,6-benzothiazocine.—This compound is prepared by the method described in Example 4(b) from 8-fluoro-2,3,4,5-tetrahydro-6H-1,6-benzothiazocine and 1-chloro-3-dimethylamino-propane.

B.P. of the base, 96–99° C. (0.001 mm. Hg). M.P. of the hydrochloride, 155–156° C Calculated for $C_{15}H_{23}FN_2S \cdot HCl$ (percent): Cl⁻, 11.11; N, 8.78; S, 10.08. Found (percent): Cl⁻, 11.40; N, 8.65; S, 10.18.

EXAMPLE 8

8-chloro-6-(3-dimethylamino-propyl)-3-methyl-2,3,4,5-tetrahydro-6H-1,6-benzothiazocine (a) 8 - chloro-3-methyl-2,3,4,5-tetrahydro - 6H - 1,6-benzothiazocine.—This compound is prepared by reduction of 8-chloro-3-methyl-2,3-dihydro-6H-1,6-benzothiazocin-5-(4H)-one according to the method described in Example 1. The product of the reduction was used crude for the following step.

(b) 8 - chloro-6-(3-dimethylamino-propyl)-3-methyl-2,3,4,5 - tetrahydro-6H-1,6-benzothiazocine.—This compound is prepared by the method described in Example 4(b) from crude 8-chloro-3-methyl-2,3,4,5-tetrahydro-6H-1,6-benzothiazocine and 1 - chloro-3-dimethylamino-propane. After reaction and separation, the condensation product is converted into the hydrochloride.

M.P. of the hydrochloride, 152–153° C.

Calculated for $C_{16}H_{25}ClN_2S \cdot HCl$ (percent): Cl⁻, 10.15; N, 8.01; S, 9.17. Found (percent): Cl⁻, 10.50; N, 8.03; S, 9.40.

EXAMPLE 9

8-chloro-6-(3-dimethylamino-2-methyl-propyl)-2,3,4,5-tetrahydro-6H-1,6-benzothiazocine This compound is prepared by the method described in Example 4(b) from 8-chloro-2,3,4,5-tetrahydro-6H-1,6-benzothiazocine (prepared as in Example 2(a)) and 1-chloro-3-dimethylamino-2-methyl-propane.

B.P. of the base, 130–135° C. (0.001 mm. Hg). M.P. of the base, 71–72° C. M.P. of the hydrochloride, 103–104° C. (decomposition).

Calculated for $C_{16}H_{25}ClN_2S \cdot HCl$ (percent): Total Cl, 20.28; N, 8.0; S, 9.17. Found (percent): Total Cl, 19.58; N, 7.6; S, 8.7.

EXAMPLE 10

8-chloro-6-{3-[4-(2-hydroxyethyl) - piperazino] - propyl}-2,3,4,5-tetrahydro-6H-1,6-benzothiazocine (a) 8-chloro - 6 - (3-chloropropyl)-2,3,4,5-tetrahydro-6H-1,6-benzothiazocine.—A mixture of 32 g. 8-chloro- 2,3,4,5-tetrahydro-6H-1,6-benzothiazocine, 24 g. 1-chloro-3-bromo-propane and 18 g. sodium carbonate is heated for 10 hours at 100–105° C. 100 ml. benzene are then added, the precipitate is filtered, the filtrate evaporated and the residue distilled.

B.P. 138–140° C. (0.001 mm. Hg).

(b) 2 - chloro-6-{3-[4-(2-hydroxyethyl)-piperazino]-propyl) - 2,3,4,5 - tetrahydro-6H-1,6-benzothiazocine.— 11.1 g. of the 3-chloropropyl compound prepared in (a) above are heated for 20 hours at 120° C. with 14 g. 1-(2-hydroxyethyl)-piperazine. The mixture is cooled at 80° C. and 100 ml. benzene are added. The precipitate thus obtained is filtered and the benzene filtrate extracted with a 10% aqueous hydrochloric acid solution. The hydrochloric acid solution is then rendered alkaline with a 40% aqueous sodium hydroxide solution and the free base is extracted with benzene. After washing and drying, the solvent is then evaporated and the residue converted into the dihydrochloride. After recrystallization from isopropanol, the dihydrochloride melts at 235–237° C.

Calculated for $C_{19}H_{30}ClN_3OS \cdot 2HCl$ (percent): Cl⁻, 15.52; total Cl, 23.28; S, 7.01. Found (percent): Cl⁻, 16.0; total Cl, 23.3; S, 7.15.

EXAMPLE 11

8-chloro-6-(3-diallylamino-propyl)-2,3,4,5-tetrahydro-6H-1,6-benzothiazocine 17.4 g. 8-chloro-6-(3-chloropropyl)-2,3,4,5-tetrahydro-6H-1,6-benzothiazocine, prepared as in Example 10(a), are refluxed for 15 hours with 13 g. diallylamine in 20 ml. xylene. The formed precipitate is filtered off and washed with benzene. The organic layer is washed with water, evaporated to dryness and the residue is distilled in vacuo.

B.P. of the base, 157–160° C. (0.001 mm. Hg). M.P. of the hydrochloride, 127–128° C.

Calculated for $C_{19}H_{27}ClN_2S \cdot HCl$ (percent): Total Cl, 18.3; N, 7.2; S, 8.27. Found (percent): Total Cl, 18.0; N, 7.10; S, 8.35.

EXAMPLE 12

8-chloro-6-(3-methylamino-propyl)-2,3,4,5-tetrahydro-6H-1,6-benzothiazocine (a) 8 - chloro-6-[3-(N-carbethoxy-N-methylamino)-propyl] - 2,3,4,5 - tetrahydro-6H-1,6-benzothiazocine.— 60 g. of the corresponding dimethylamino compound (the compound of Example 2) are dissolved in 60 ml. benzene and 60 g. ethyl chloroformate in 130 ml. benzene are added to the solution, while maintaining the temperature at 25–30° C. and stirring. The reaction mixture is then boiled under reflux for 20 hours. The mixture is filtered and the filtrate washed with water. The solution is dried, the solvent evaporated and the residue distilled.

B.P. 165° C. (0.001 mm. Hg).

(b) 8 - chloro-6-(3-methylamino-propyl)-2,3,4,5-tetrahydro - 6H - 1,6-benzothiazocine.—20 g. of the N-carbethoxy compound obtained in (a) above in 100 ml. concentrated hydrochloric acid are boiled under reflux for 17 hours. The reaction product is concentrated in vacuo, then diluted with water and rendered alkaline with a 40% aqueous sodium hydroxide solution. The organic layer is extracted with benzene, washed with water, dried and then concentrated in vacuo. The residue is then converted into the hydrochloride in isopropanol.

M.P. of the hydrochloride, 174–175° C.

Calculated for $C_{14}H_{21}ClN_2S$ (percent): N, 8.71; Total Cl, 22.07; Found (percent): N, 8.75; Total Cl, 21.05.

EXAMPLE 13

8-chloro-6-(2-methylamino-ethyl)-2,3,4,5-tetrahydro-6H-1,6-benzothiazocine (a) 8 - chloro-6-(2 - carbethoxyamino-ethyl)-2,3,4,5-tetrahydro-6H-1,6-benzothiazocine.—A solution of 13 g. 8-chloro - 6 - (2-aminoethyl)-2,3,4,5-tetrahydro-6H-1,6-benzothiazocine and 10.5 ml. triethylamine in 40 ml. benzene is reacted with 6 g. ethyl chloroformate, while keeping the temperature below 20° C. The mixture is stirred for 30 minutes and then heated for 2 hours at 35–40° C. Water is added and the organic layer separated. After washing with water, the organic layer is evaporated to dryness and the crystalline residue is recrystallized from aqueous isopropanol.

M.P. 60–61° C.

(b) 8-chloro - 6 - (2-methylamino-ethyl)-2,3,4,5-tetrahydro-6H-1,6-benzothiazocine.—A solution of 15 g. of the carbethoxy compound, prepared in (a), in 50 ml. ether is added dropwise to a suspension of 3.8 g. lithium aluminum hydride in 200 ml. ether and the mixture is then refluxed for about 10 hours. 3.8 ml. water, 3.8 ml. of a 20% aqueous sodium hydroxide solution and 11.5 ml. water are added successively and the mixture is filtered. The filtrate is washed with water, dried and evaporated to dryness. The residue is converted into the hydrochloride in isopropanol.

M.P. of the hydrochloride, 143–145° C.

Calculated for $C_{13}H_{19}ClN_2S \cdot HCl$ (percent): Total Cl, 23.07; N, 9.11; S, 10.4. Found (percent): Total Cl, 23.00; N, 9.06; S, 10.5.

EXAMPLE 14

8-chloro-6-(2-aminoethyl)-2,3,4,5-tetrahydro-6H-1,6-benzothiazocine (a) 8-chloro - 6 - cyanomethyl-2,3,4,5-tetrahydro-6H-1,6-benzothiazocine.—A mixture of 42.7 g. 8-chloro-2,3,4,5-tetrahydro-6H-1,6-benzothiazocine (cfr. Example 2 (a)), 25 g. chloroacetonitrile and 25 g. anhydrous sodium carbonate is heated for 12 hours at 95–100° C. After cooling, benzene is added and the mixture is filtered. The filtrate is evaporated to dryness and the residue is distilled.

B.P. 140–142° C. (0.001 mm. Hg).

(b) 8-chloro - 6 - (2-aminoethyl)-2,3,4,5-tetrahydro-6H-1,6-benzothiazocine.—This compound is prepared by the method described in Example 1 by reduction of 8-chloro-6-cyanomethyl - 2,3,4,5 - tetrahydro-6H-1,6-benzothiazocine with lithium aluminum hydride. The crude product of reduction is converted into the hydrochloride.

B.P. of the base, 123–126° C. (0.001 mm. Hg). M.P. of the hydrochloride, 217.5–218.5° C.

Calculated for $C_{12}H_{17}ClN_2S \cdot HCl$ (percent): Cl⁻, 12.09; N, 9.55; S, 10.93. Found (percent): Cl⁻, 12.12; N, 9.46; S, 10.95.

The following compound has also been prepared by the method described in this example: 6-(2-aminoethyl)-2,3,4,5-tetrahydro-6H-1,6-benzothiazocine.

M.P. of the hydrochloride, 153–154° C.

Calculated for $C_{12}H_{18}N_2S \cdot HCl$ (percent): Cl⁻, 13.70; N, 10.82; S, 12.38. Found (percent): Cl⁻, 13.72; N, 10.54; S, 12.60.

What is claimed is:

1. A compound selected from the group consisting of the N-amino-alkyl-benzothiazacycloalkane bases of the formula:

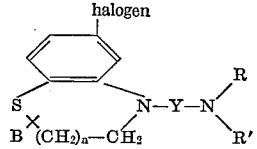

and pharmaceutically acceptable acid addition salts thereof, wherein
halogen is chlorine or fluorine,
B is a member selected from the group consisting of hydrogen and a lower alkyl,
R and R′ taken separately each represents a member selected from the group consisting of hydrogen, lower alkyl and lower alkenyl and taken together with the nitrogen atom to which they are attached represent a heterocyclic group selected from the group consisting of pyrrolidino, piperidino, morpholino, piperazino, 4-methyl-piperazino and 4-(2-hydroxyethyl)-piperazino, Y is an alkylene radical containing 1 to 5 carbon atoms and n is 3.

2. The compound 8-chloro - 6 - (3-dimethylamino-propyl) - 2,3,4,5 - tetrahydro-6H-1,6-benzothiazocine.

3. The compound 8-chloro - 6 - (3-pyrrolidino-propyl)-2,3,4,5-tetrahydro-6H-1,6-benzothiazocine.

4. The compound 8-chloro - 6 - (2-dimethylamino-ethyl)-2,3,4,5-tetrahydro-6H-1,6-benzothiazocine.

5. The compound 8 - chloro - 6 - (2-diethylamino-ethyl)-2,3,4,5-tetrahydro-6H-1,6-benzothiazocine.

6. The compound 8-fluoro - 6 - (3-dimethylamino-propyl)-2,3,4,5-tetrahydro-6H-1,6-benzothiazocine.

7. The compound 8-chloro - 6 - (3-dimethylamino-propyl) - 3 - methyl-2,3,4,5-tetrahydro-6H-1,6-benzothiazocine.

8. The compound 8-chloro - 6 - (3-dimethylamino-2-methyl - propyl) - 2,3,4,5 - tetrahydro-6H-1,6-benzothiazocine.

9. The compound 8-chloro - 6 - {3-[4-(2-hydroxyethyl) - piperazino]-propyl} - 2,3,4,5 - tetrahydro-6H-1,6-benzothiazocine.

10. The compound 8-chloro - 6 - (3-diallyl-aminopropyl)-2,3,4,5-tetrahydro-6H-1,6-benzothiazocine.

11. The compound 8-chloro - 6 - (3-methylaminopropyl)-2,3,4,5-tetrahydro-6H-1,6-benzothiazocine.

12. The compound 8 - chloro - 6 - (2-methylaminoethyl)-2,3,4,5-tetrahydro-6H-1,6-benzothiazocine.

13. The compound 8-chloro - 6 - (2-aminoethyl)-2,3,4,5-tetrahydro-6H-1,6-benzothiazocine.

References Cited
UNITED STATES PATENTS

| 3,400,119 | 9/1968 | Wenner et al. | 260—239.3 |
| 3,311,615 | 3/1967 | Mohrbacher | 260—239.3 |
| 3,117,124 | 1/1964 | Krapcho et al. | 260—243 |

HENRY R. JILES, Primary Examiner

C. M. SHURKO, Assistant Examiner

U.S. Cl. X.R.

260—239.3, 247.1, 268, 326.5, 326.62, 326.81; 424—248, 250, 267, 274, 275